Patented Oct. 6, 1953

2,654,654

UNITED STATES PATENT OFFICE 2,654,654

PROCESS FOR THE PRODUCTION OF URANIUM TETRAFLUORIDE

Amy S. Leah, Runcorn, and Ronald B. Mooney, Liverpool, England, assignors to Imperial Chemical Industries Limited, a corporation of Great Britain No Drawing. Application December 17, 1943, Serial No. 514,718. In Great Britain January 16, 1942

11 Claims. (Cl. 23—14.5)

This invention relates to improvements in the manufacture of inorganic salts, and more particularly to the manufacture of uranium tetrafluoride.

Various methods of preparing uranium halides have been proposed, but in general such methods are complicated by the readiness with which uranyl compounds are formed.

According to the present invention uranium tetrafluoride is prepared by a process which comprises heating an ammonium uranium fluoride to a temperature at which dissociation occurs with liberation of ammonium fluoride. Preferably the process is carried out under reduced pressure, or in a current of an inert gas.

Anhydrous ammonium uranium fluoride $NH_4UF_5$ or hydrated ammonium uranium fluoride $NH_4UF_5$, $\frac{1}{2}H_2O$ may be used as the starting material, and when the hydrated salt is used a preliminary heating may be given to effect dehydration. Suitable temperatures at which to effect the decomposition are, e. g. 400–600° C.

In the copending application Serial No. 514,717, filed December 17, 1943, we have described a method for the preparation of ammonium uranium fluoride by the addition of hydrofluoric acid and/or a soluble fluoride to an aqueous solution of a uranous compound in the presence of an ammonium salt. The product thus obtained is very suitable for use as the starting material in the process of the present invention.

When carrying out the process in an atmosphere of an inert gas, such as nitrogen, a stream of the gas may be passed over the ammonium uranium fluoride while the temperature is gradually raised to dry or dehydrate the material if necessary, and then to induce the splitting-off of ammonium fluoride which at the temperature of decomposition is carried away in the gas stream leaving the required uranium tetrafluoride in the reaction vessel. The dehydration occurs at a temperature below that at which splitting-off of ammonium fluoride occurs, and it is desirable to complete the dehydration before raising the temperature to split off ammonium fluoride. When working under reduced pressure the process is effected in a similar fashion, but the ammonium fluoride instead of being carried away in the gas stream will sublime and condense in cooler parts of the apparatus.

The uranium tetrafluoride which is obtained may be immediately used for the preparation of further compounds. It may, for example, be fluorinated to give uranium hexafluoride, or, if desired, it may be treated to remove impurities or adventitious matter which may be present.

The following example illustrates but does not limit our invention, all parts being by weight:

*Example*

Ammonium uranium fluoride was prepared according to the method described in copending application Serial No. 514,717, filed December 17, 1943, by adding concentrated hydrofluoric acid to an aqueous solution of ammonium chloride and uranium tetrachloride in equimolecular proportions, washing the precipitated salt $NH_4UF_5$, $\frac{1}{2}H_2O$ and drying it at 100° C. to $NH_4UF_5$. It then contained 67.2% U. The ammonium uranium fluoride was then heated under a reduced pressure of 5 mms. Hg. The temperature rose to 400° C. during four hours and was maintained at this temperature for a further two hours. Ammonium fluoride was thereby removed leaving behind uranium tetrafluoride containing 75.2% uranium. The theoretical value for $UF_4$ is 75.8%.

We claim:

1. A process for the production of uranium tetrafluoride which comprises heating an ammonium uranium fluoride at a temperature at which dissociation occurs with liberation of ammonium fluoride so as to directly produce uranium tetrafluoride.

2. A process for the production of uranium tetrafluoride which comprises heating an ammonium uranium fluoride at a temperature between 400° C. and 600° C. so as to directly produce uranium tetrafluoride.

3. A process for the production of uranium tetrafluoride which comprises heating an ammonium uranium fluoride in a stream of inert gas at a temperature at which dissociation occurs with liberation of ammonium fluoride so as to directly produce uranium tetrafluoride.

4. A process for the production of uranium tetrafluoride which comprises heating an ammonium uranium fluoride in a stream of inert gas at a temperature between 400° C. and 600° C. so as to directly produce uranium tetrafluoride.

5. A process for the production of uranium tetrafluoride which comprises adding a compound selected from the group consisting of hydrofluoric acid and the water soluble fluorides to an aqueous solution of a uranous compound in the presence of an ammonium salt, removing the resultant precipitate, and subsequently heating the precipitated material at a temperature at which dissociation of the precipitate occurs with liberation of ammonium fluoride so as to directly produce uranium tetrafluoride.

6. A process according to claim 5 in which the said precipitated material is heated at a temperature between 400° C. and 600° C.

7. A process according to claim 5 in which the said ammonium salt is ammonium chloride.

8. A process for the production of uranium tetrafluoride which comprises the step of heating hydrated ammonium-uranium fluoride $NH_4UF_5, \frac{1}{2}H_2O$ at a temperature at which the water of hydration is driven off and a dehydrated ammonium-uranium fluoride $NH_4UF_5$ is formed, and subsequently raising the temperature of the said dehydrated fluoride to bring about its dissociation with liberation of ammonium fluoride so as to directly produce uranium tetrafluoride.

9. A process for the production of uranium tetrafluoride which comprises the step of heating hydrated ammonium-uranium fluoride $NH_4UF_5, \frac{1}{2}H_2O$ at a temperature at which the water of hydration is driven off and a dehydrated ammonium-uranium fluoride $NH_4UF_5$ is formed, and subsequently heating the said dehydrated fluoride at a temperature between 400° C. and 600° C. so as to directly produce uranium tetrafluoride.

10. A process for the production of uranium tetrafluoride which comprises the step of heating hydrated ammonium-uranium fluoride $NH_4UF_5, \frac{1}{2}H_2O$ at a temperature at which the water of hydration is driven off and a dehydrated ammonium-uranium fluoride $NH_4UF_5$ is formed, and subsequently raising the temperature of the said dehydrated fluoride in a stream of inert gas to bring about its dissociation with liberation of ammonium fluoride so as to directly produce uranium tetrafluoride.

11. A process for the production of uranium tetrafluoride which comprises the step of heating hydrated ammonium-uranium fluoride $NH_4UF_5, \frac{1}{2}H_2O$ at a temperature at which the water of hydration is driven off and a dehydrated ammonium-uranium fluoride $NH_4UF_5$ is formed, and subsequently heating the said dehydrated fluoride in a stream of inert gas at a temperature between 400° C. and 600° C. so as to directly produce uranium tetrafluoride.

AMY S. LEAH.
RONALD B. MOONEY.

References Cited in the file of this patent

Journal General Chemistry (U. S. S. R.), vol. 6, pages 1701–14 (1936).